Aug. 26, 1958          J. H. KUCK          2,849,183
DISTRIBUTION CURVE ANALYZER
Filed May 1, 1956
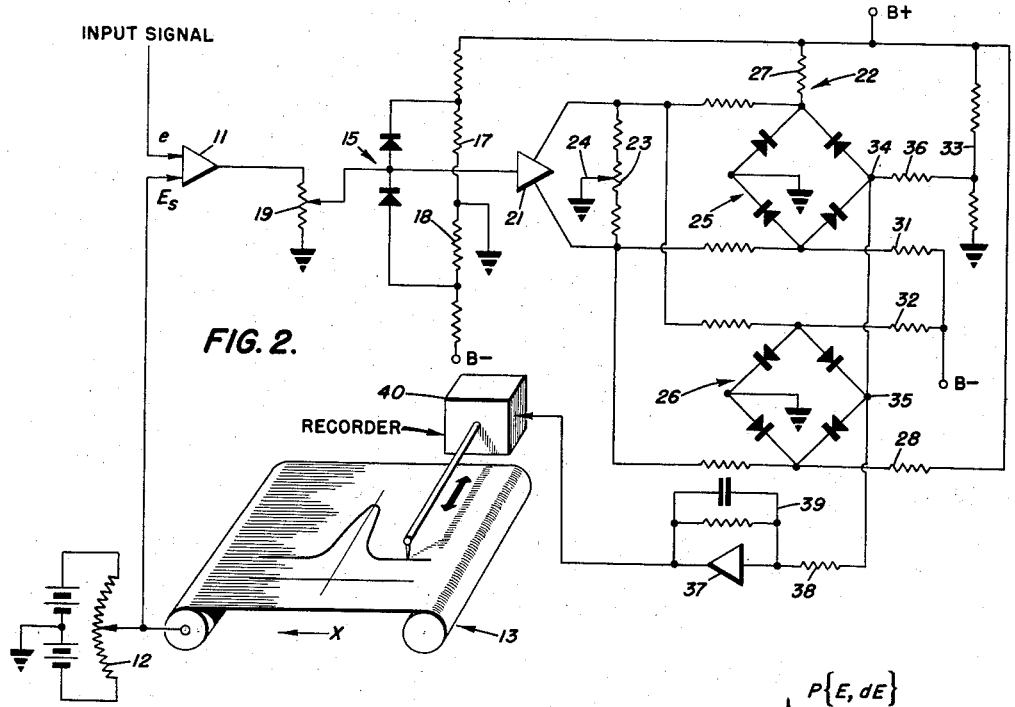
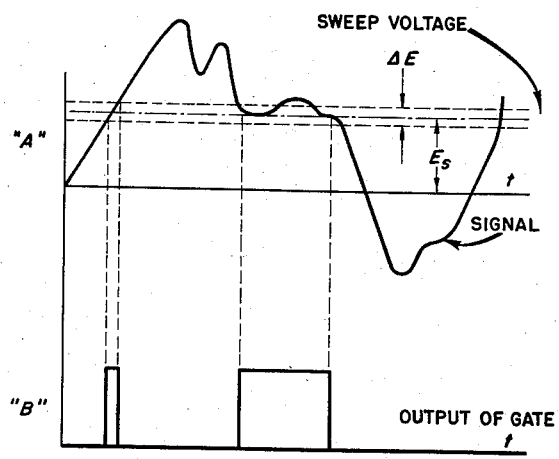
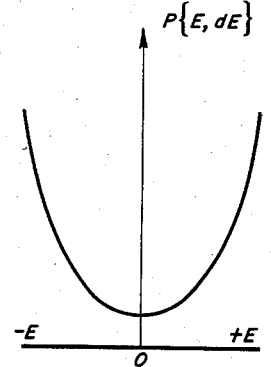
JOHN H. KUCK
INVENTOR
BY
ATTORNEYS

United States Patent Office 2,849,183
Patented Aug. 26, 1958

2,849,183

DISTRIBUTION CURVE ANALYZER

John H. Kuck, Silver Spring, Md., assignor to the United States of America as represented by the Secretary of the Navy Application May 1, 1956, Serial No. 582,050

5 Claims. (Cl. 235—61)

The present invention relates to an amplitude distribution curve analyzer. More specifically, this invention relates to a means automatically providing a graphic representation of the probability of the occurrence of a given amplitude in a complex electrical signal.

An amplitude distribution curve is of particular use in fixing the characteristics of random noise signals. Inasmuch as a random signal, by its nature, cannot be represented as comprising any particular frequency or amplitude, it is only by statistical techniques that realistic specification can be made of the characteristics thereof. An important application of the statistical analysis of a random signal is found in the synthesis of radar echo signals. By supplying a radar receiver with a signal which has an amplitude and phase distribution characteristic corresponding to measured radar echo characteristics, various detector or tracking circuits can be realistically tested.

It is therefore an important object of the present invention to provide a means for analyzing random or complex electrical signals in terms of their amplitude distributions.

Another object of the invention is to provide a means including a comparison circuit for determining the correspondence of the amplitude of a complex wave with the magnitude of a given reference voltage and developing an output voltage proportional to the time duration of such correspondence.

A further object of the invention is to provide means for graphically indicating the probability of occurrence of a given amplitude in a complex signal.

Other objects and many of the attendant advantages of this invention will be readily appreciated as the same becomes better understood by reference to the following detailed description when considered in connection with the accompanying drawings, wherein:

Fig. 1 is an amplitude distribution curve typical of a sinusoidal waveform;

Fig. 2 is a schematic block diagram of the amplitude distribution curve analyzer of the present invention; and Figs. 3A and 3B are diagrams illustrating the waveforms present at various points in the distribution curve analyzer.

Referring to Fig. 1, there appears an amplitude distribution curve for a sinusoidal wave. The curve indicates the probable amplitude which would be observed upon taking a sample at random from the signal. It will be observed that the probability is highest at the voltage corresponding to the peak amplitude of the wave. Therefore, if a measurement were made of the instantaneous value of the wave at a random time, the value obtained would most probably be the peak value. On the other hand, there is a very slight probability that the measurement would indicate a zero instantaneous value. The sinusoidal distribution curve assumed a shape which might be anticipated from the consideration that a sinusoidally varying voltage passes through zero relatively rapidly, but for the major part of the cycle the voltage is near the peak value of the wave.

The foregoing example was chosen for the purpose of illustrating the desired form of representation of the properties of an electrical wave. Random functions more frequently have a Gaussian or Rayleigh distribution curve.

In Fig. 2 these appears a schematic block diagram of the analyzer of the present invention, which automatically produces plots of the type shown in Fig. 1. A difference amplifier 11 provides an output equal to the difference between the signal, $e$, to be analyzed and a sweep voltage $E_s$. The sweep voltage $E_s$ comprises the output of a potentiometer 12 which is geared to the paper drive mechanism of a conventional X—Y recorder 13.

The output of difference amplifier 11 is limited in a shunt type diode limiter 15. Voltage dividers 17 and 18, connected to the B+ and B— supply respectively, establish the output level of limiter 15. A potentiometer 19, connected to amplifier 11, controls the resolution of the analyzer.

A direct coupled amplifier 21 having a double-ended output stage receives the limited output of limiter 15 and provides amplified control voltages of opposite phase for driving the gate circuit 22. The control voltages may be equalized by an adjustable balancing resistor 23 provided with a grounded arm 24.

The gate circuit 22 comprises a pair of diode bridges 25 and 26 oppositely polarized so that one of the bridges will conduct upon the appearance of either a positive or a negative control voltage output from amplifier 21. The diodes of both bridges 25 and 26 are normally biased nonconductive by the application of positive voltages through dropping resistors 27 and 28, and by the application of negative voltages through dropping resistors 31 and 32. A constant positive voltage of relatively small magnitude, provided by a voltage divider 33, is applied to the gate switching points 34 and 35 through an isoltaing resistor 36.

The impedance of both bridges is relatively high during periods of non-conduction and, assuming that it is appreciatively higher than the value of resistor 36, the voltage at switch points 34 and 35 is very nearly equal to the output of voltage divider 33. However, when either of the bridges 25 or 26 is rendered conductive, the impedance of the conducting bridge drops to a low value and thereby reduces the voltage at switch points 34 and 35 virtually to zero. The gate circuit output therefore consists of a series of constant amplitude pulses, having varying time durations, as will be more fully explained hereinafter.

A direct-coupled inverting amplifier 37 provided with an input resistor 38 and a resistor-capacitor feedback network 39 filters the gate output to its average D. C. value. The filtered gate output controls the motion of penmotor 40 of recorder 13. Preferably, to assure smoothness and accuracy of plotting, the time constant of the network 39 is sufficiently great to provide an average over a statistically adequate period, but sufficiently small that the filter output does not excessively lag the sweep voltage.

The product of the recorder is a plot having ordinates proportional to the average output of the gate 22 for abscissa corresponding to the amplitude of the input signal, as is illustrated in Fig. 1.

The operation of the analyzer in providing the desired distribution plots can best be explained with reference to Fig. 3. In Fig. 3A, the sweep voltage $E_s$ is shown superimposed upon the signal voltage. In Fig. 3B the output of the gate 22 is plotted on the same time scale as the input signal. From Fig. 3A it will be seen that the output of difference amplifier 11 will be zero at such times as the signal amplitude is equal to the sweep voltage, within the tolerance or resolution of $$\frac{\Delta E}{2}$$

The gate 22 provides no output whenever a difference voltage having a magnitude greater than $$\frac{\Delta E}{2}$$

exists, since either a greater positive or a greater negative output of amplifier 11 will cause one of the bridges 25 or 26 to conduct and thereby short circuit the output of voltage divider 33. The gate output therefore occurs during such time as the signal has an amplitude equal to $E_s$ plus or minus $$\frac{\Delta E}{2}$$

It will be evident from a study of Fig. 3, that the greater the percentage of total time the signal voltage corresponds to the sweep voltage, the greater is the gate output, with the result that a high probability of occurrence of an amplitude equal to that sweep voltage is indicated upon the curve.

Obviously many modifications and variations of the present invention are possible in the light of the above teachings. It is therefore to be understood that within the scope of the appended claims the invention may be practiced otherwise than as specifically described.

What is claimed is:

1. An analyzer for plotting the probability of the occurrence of a given amplitude in an electrical wave comprising, a recorder providing a graphic record of the value of a dependent variable against an independent variable, means for generating a sweep voltage constituting said independent variable, means providing a voltage proportional to the difference between said sweep voltage and said electrical wave, a gate circuit controllable by the output of said difference means for providing an output upon the occurrence of substantial equality in the amplitudes of said sweep voltage and said electrical wave and means providing a voltage proportional to the average value of said gate output, said average value constituting said dependent variable.

2. An analyzer for plotting the probability of the occurrence of a given amplitude in an electrical wave comprising, means for generating a time varying reference voltage independent of the signal to be analyzed, means receiving said reference voltage and the signal to be analyzed to provide the difference therebetween, a source of potential, a gate circuit connected to said source of potential and actuated by said difference for short circuiting said source of potential, means for filtering the voltage output of said source of potential, and means for plotting said filtered voltage as a function of time.

3. An analyzer as claimed in claim 2, wherein said gate circuit comprises a diode bridge normally presenting a high impedance to said source of potential, the impedance of said bridge being converted to a low value upon the appearance of an appreciable output from said means providing the difference between said reference voltage and the signal to be analyzed.

4. An analyzer for plotting the probability of the occurrence of a given amplitude in an electrical wave comprising, a difference amplifier, a gate circuit including a diode bridge, means normally biasing said diode bridge non-conductive, said diode bridge being rendered conductive by the application thereto of an output from said difference amplifier sufficient to overcome the normal bias, a source of constant potential, an impedance connected between said source and said diode bridge, means for filtering the potential present at the junction of said impedance and said bridge, the potential thereat being appreciably less during periods of bridge conduction than during periods of non-conduction, a recorder for plotting the output of said filter as a function of time, and a potentiometer coupled to the drive mechanism of said recorder for generating a reference voltage varying as a function of time, said reference voltage and the signal to be analyzed being applied as the inputs to said difference amplifier.

5. An analyzer as claimed in claim 4, with additionally a direct coupled amplifier having a double ended output stage, said additional amplifier being arranged to receive the output of said difference amplifier and supplying amplified difference voltages of opposite phase for controlling said gate circuit, and an additional diode bridge in said gate circuit, said diode bridges being oppositely polarized and each having both outputs of said additional amplifier applied thereto for rendering one of said bridges conductive upon the appearance of either a positive or negative output from said additional amplifier.

References Cited in the file of this patent

UNITED STATES PATENTS

| 2,639,386 | Karpeles | May 19, 1953 |
| 2,679,636 | Hillyer | May 25, 1954 |
| 2,679,639 | Locker | May 25, 1954 |
| 2,715,718 | Holtje | Aug. 16, 1955 |
| 2,752,589 | De Long | June 26, 1956 |

OTHER REFERENCES

Analog Computer for the Roots of Algebraic Equations (Lars Lofgren), Proceedings of the I. R. E., July 1953, pages 910–911.